Patented June 22, 1926.

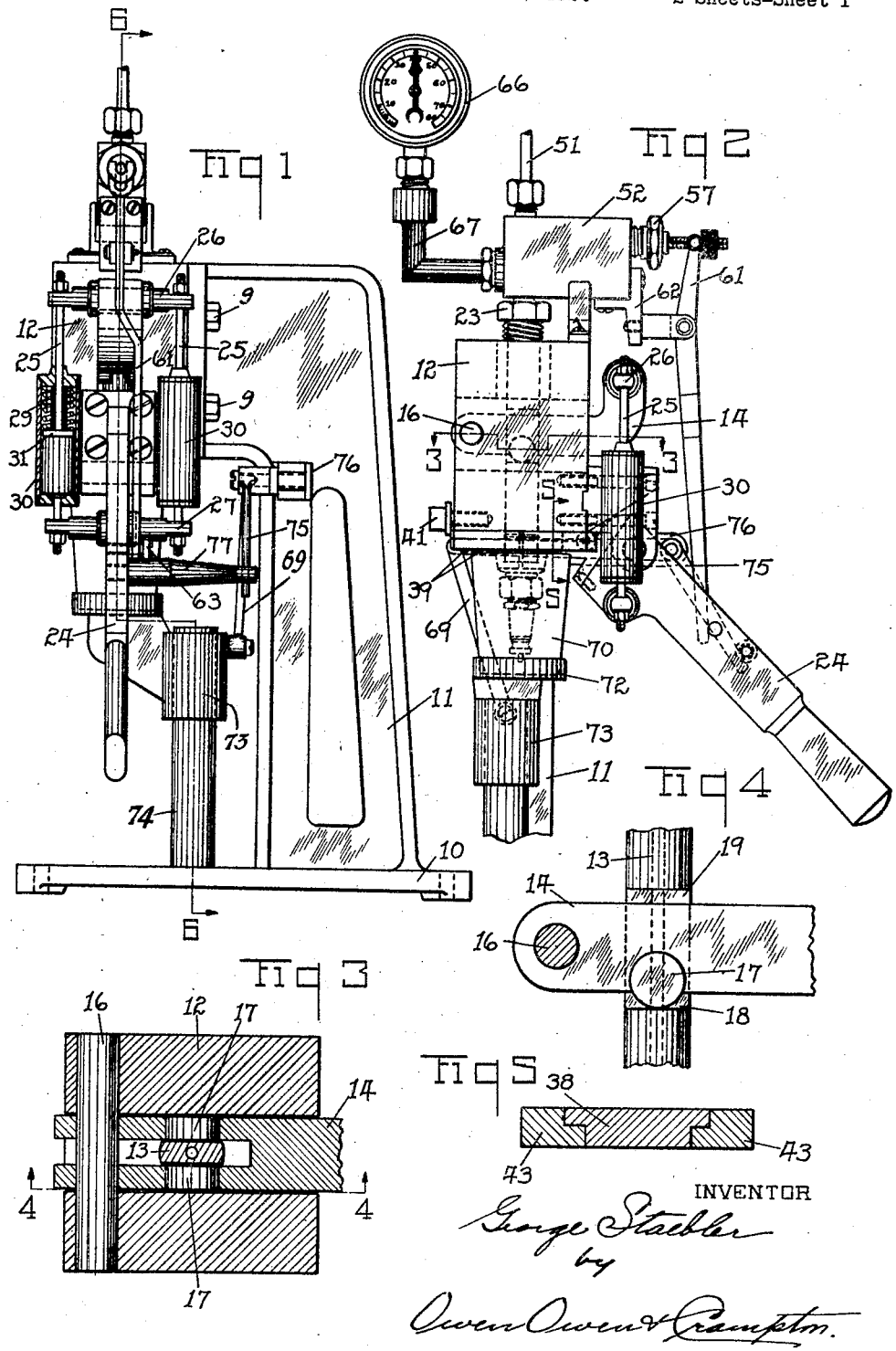

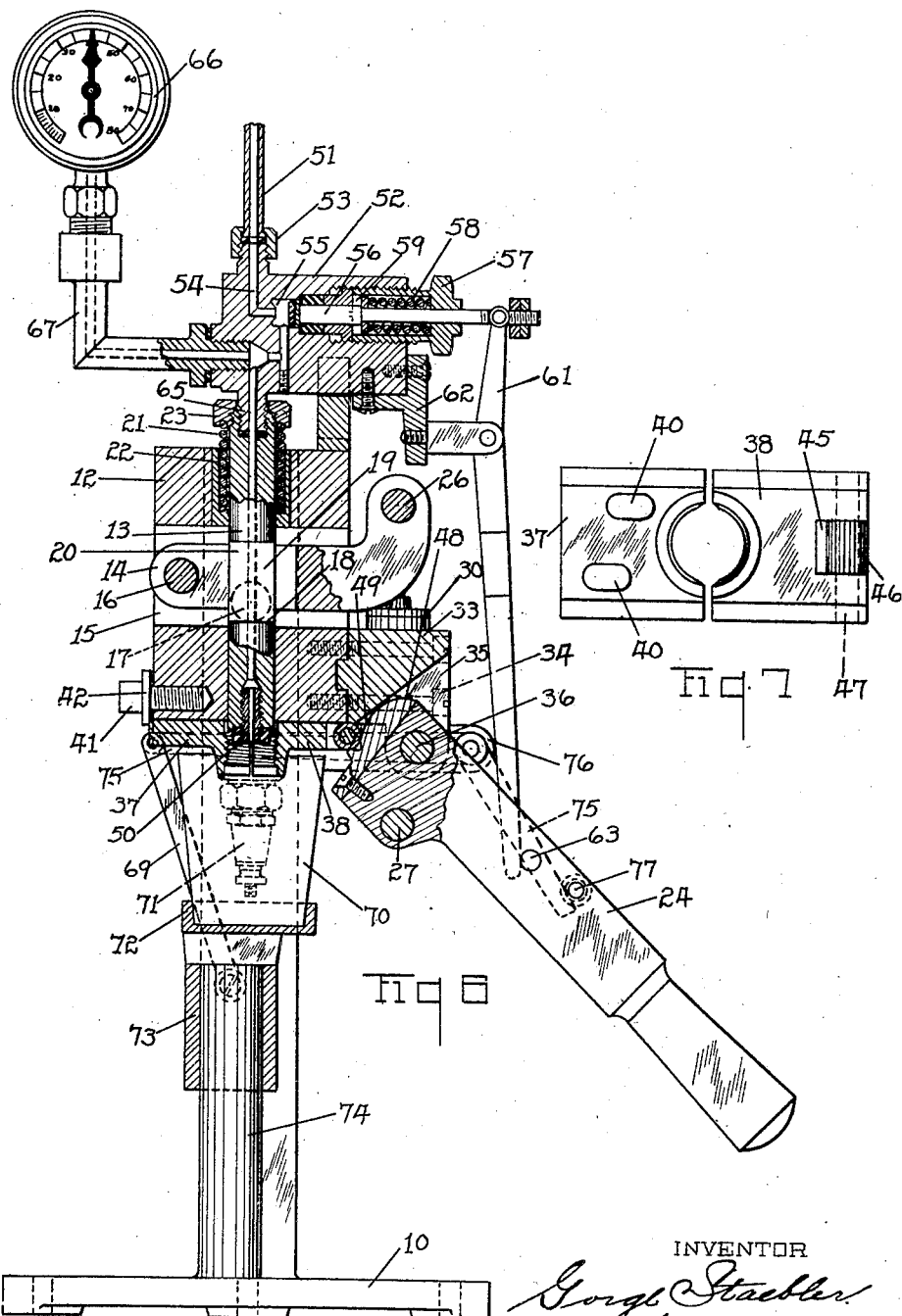

1,589,825

UNITED STATES PATENT OFFICE.

GEORGE STAEBLER, OF TOLEDO, OHIO.

SPARK-PLUG TESTER.

Application filed June 4, 1924. Serial No. 717,681.

My invention has for its object to provide a machine for testing spark plugs by subjecting the plugs to a high pressure and determining whether there is any leakage between the parts of the plug and the location of such leakage in order that the plug may be corrected and the leakage obviated. The invention is particularly advantageous in spark plug factories where plugs are made in large quantities and at a comparatively low cost of production, and consequently all testing and correcting of such plugs must be done with rapidity and at little cost. I have found that if plugs are subjected to an exceedingly high pressure, practically all of their faults will be corrected by eliminating all leakage occurring at the high pressure. My invention therefore consists in a machine wherein the plugs may be rapidly subjected to high pressures in combination with means for detecting the location of the slightest leakage through the plug.

The invention may be contained in machines of different forms. To illustrate a practical application of the invention I have selected a machine containing the invention and shall describe it hereinafter. The machine selected for purposes of illustration is shown in the accompanying drawings.

Figure 1 of the drawings illustrates an end view of the machine. Fig. 2 illustrates a side view. Fig. 3 illustrates a sectional view taken on the line 3—3 indicated in Fig. 2. Fig. 4 is a sectional view taken on the line 4—4 indicated in Fig. 3 and illustrates side views of parts of the mechanism. Fig. 5 is a sectional view of a part of the mechanism shown in Fig. 2 and is a view taken on the line 5—5 indicated in Fig. 2. Fig. 6 is a sectional view taken on the line 6—6 indicated in Fig. 1. Fig. 7 is an end side view of the spark plug clamp.

In Figs. 1 and 6 is shown a base 10 for supporting the machine and which may be connected to any suitable bench where the machine may be conveniently operated. A pedestal 11 may be integrally formed with the base 10. The mechanism is supported on the upper end of the pedestal.

A block 12 is bolted to the pedestal 11 by means of the bolts 9. A tubular member 13 extends through the block 12 and is slidably movable within the block. It is positively moved in one direction by means of a lever 14 that is located in a rectangular opening 15 formed in the block and extending at right angles to the tubular member 13. The lever 14 is pivoted to the block 12 by means of the pin 16 and is mechanically connected to the tubular member 13 by means of cylinders 17 that are located in recesses formed in the lever 14 between the tubular member 13 and one of the surfaces of the rectangular opening 15. The cylinders 17 engage ledges or shoulders 18 formed in the tubular member 13 so that when the lever 14 is depressed, the cylinders 17 engage the shoulders 18 so as to pull the tubular member 13 downward.

The lever 14 is preferably bifurcated or slotted so as to receive the tubular member 13, and the tubular member 13 is provided with recesses 19. The body portion of the tubular member 13 is cylindrical while the surfaces 20 of the recesses are plane. These surfaces form the shoulders 18 against which the cylinders 17 are pressed by the operation of the lever 14. The return movement of the tubular member 13 may be caused by means of a spring 21 that is located in a sleeve 22 and between the lower end of the sleeve 22 and a nut 23 that may be threaded on to the end of the tubular member 13. When, therefore, the lever 14 is released, the spring 21 will raise the tubular member.

The lever 14 is operated by means of a lever 24 to which it is connected by means of links 25 and cross pins 26 and 27 that extend, one through the end of the lever 14 and the other through the lever 24. The links 25 may be provided with resilient parts to allow for movement of the lever 24 relative to the lever 14 without forcing movement in the lever 14. Thus springs 29 may be located in cylinders 30 and the links 25 may be each formed of two parts, one of which is connected to a piston or disc 31 and the other is connected to the cylinder 30, the springs 29 being located between the discs 31 and the upper ends of the cylinders 30. This permits a certain amount of movement of the lever 24 after the lever 14 has reached the limit of its downward movement.

The lever 24 is connected to the block 33 which in turn is connected to the block 12 by suitable machine bolts, such as the bolts 34. It is to be understood that the block 12 and block 33 may be integral if desired. The block 33 is provided with a slot 35 in which the end of the lever 24 is located and pivotally supported by means of the pin 36.

The lever 24 not only operates to lower the tubular member 13 but also operates to close the spark plug clamp in which a spark plug may be located in an inverted position. The spark plug clamp is formed of two clamping members 37 and 38. The member 37 is adjustably secured in position to the block 12 by means of suitable screw bolts 39 shown in Fig. 2 that extend through slots 40 formed in the member 37 shown in Fig. 7. The position of the clamping member 37 is also adjustably secured by means of the bolt 41 that is provided with a flange 42 that extends over the outer end of the clamping member 37. The other clamping member is slidably supported on the lower side of the block 12 by means of the travel blocks or strips 43 that may extend across the end of the block 12 and cover the edges of both clamping members 37 and 38. The outer end of the clamping member 38 is slotted as at 45 and a roller 46 is supported in the slot 45 by means of the pin 47. The end of the lever near its pivot pin 36 is curved so as to operate cam-wise on the roller 46. The portion of the curve at 48 causes the clamping member 38 to be moved inward to clamp the threaded shell of the spark plug. This preferably occurs before the lever 14 engages with the tubular member 13 to cause downward movement of the tubular member. The portion of the curve 49 has its center in the axis of the pin 36 and consequently operates to hold the clamping member 38 in its position, while the lever 24 continues to move downward to draw the lever 14 down and consequently to draw the tubular member 13 downward, as far as will be permitted, by the resiliency of the springs 29 located in the mechanical connections between the lever 24 and the lever 14. The lower end of the tubular member 13 is of such dimension that when the spark plug has been clamped in position, it will engage and cover the end of the shell of the spark plug. The end of the tubular member 13 is provided with a sealing washer 50 formed of a packing material such as rubber, or other material, that will seal the connection between the interior of the tubular member and of the shell of the spark plug. Thus the interior of the spark plug may be subjected to a high pressure of air that may be conveyed to the spark plug through the tubular member 13.

Air may be supplied under pressure from a suitable source through a pipe 51 that is connected to a head 52 by a suitable connector 53. A bore 54 that terminates in a valve seat 55 is formed in the head 52 and a spring pressed valve member 56 operates to close the end of the bore 54. The valve member 56 is located in a suitable shell 57 that is threaded into the head 52 and is surrounded by a spring 58 located between a washer 59 and the end of the shell 57 to press the valve member 56 towards the end of the bore 54 to close it. The valve member 56, however, may be moved from the seat by means of a lever 61 that is pivotally supported by means of a suitable bracket, such as the bracket 62, on the head 52. The lever 61 extends downward to the lever 24 and a pin 63, that extends laterally from the lever 24, engages the end of the lever 61 to move the lever 61 so as to open the valve and permit the air to pass through the bore 54 and into the machine when the spark plug is securely clamped between the clamping members 37 and 38. The tubular member 13 is connected to the head 52 by means of the nipple 65 and the head 52 is provided with suitable bores whereby the air passes through the head and into the interior of the tubular member 13 and the shell of the spark plug. A pressure gauge 66 is also connected to the bores of the head 52 that lead from the valve seat 55 to the interior of the tubular member 13, by means of a suitable pipe 67, one end of which is threaded into the head 52, whereby the number of atmospheres to which the plug is subjected may be indicated.

The leakage of the spark plug may be at any one of a number of points, such as, between the insulating member or core and the shell, or between parts of the shell where the shell is formed of two parts, or between the core and the central electrode. In order to determine the location of the leakage, the spark plug is surrounded by a suitable transparent liquid, preferably gasoline or alcohol, that is, any liquid having a specific gravity less than that of water because the low viscosity of these liquids renders the air bubbles readily visible. In order that the spark plug may be readily surrounded with the liquid, a thin glass beaker 70 is supported below the spark plug 71 on a movable platform 72 that contains the liquid. The platform 72 is supported on a sleeve 73 that surrounds a pedestal 74 that may be formed integral or connected to the base 10. The sleeve 73 is connected to a V-shaped lever 75 by means of a link 69 that is pivotally connected to an arm 76 that is fixed to and extends outwardly from the pedestal 11. One arm of the lever 75 is located beneath the end of the finger 77 that is secured to the lever 24, so that upon downward movement of the lever 24, the sleeve 73 is pulled up by means of the link 69 and the lever 75 and so as to submerge the plug 71 in the liquid contained in the glass beaker 70. When, therefore, the air valve is opened and the spark plug 71 is submitted to the required pressure, the possible escape of the air between the parts of the spark plug is examined through the liquid and the location of the bubbles that may be formed at these points indicates the amount and the location of the leakage. If the spark plug has a leakage at any of these points, it may be easily removed from the machine by merely raising the lever 24, which will lower the container 70 and shut off the air, and subsequently open the clamp and allow the spark plug to fall from the machine. The spark plug may then be corrected in any suitable manner, according to the character of the spark plug, in order to obviate the leakage. A new spark plug to be tested may then be located in position and by merely moving the lever 24, which also opens a valve to connect the air with the spark plug and to raise the glass beaker 70 to submerge the spark plug in the liquid. The testing operations may thus be rapidly continued.

I claim:—

1. In a leakage testing machine for testing spark plugs, a mounting having a hollow bore, a tube movable in said bore, a main operating lever pivoted at one end to said mounting, means for connecting said lever and said tube whereby movement of said lever imparts corresponding movement to said tube, spark plug clamping members carried by said mounting and being relatively movable transverse to the axis of said tube, an operative connection between one of said members and said main operating lever, a transparent receptacle for containing a liquid, a platform supporting said receptacle, means for guiding said platform, and an operative connection between said platform and said main operating lever whereby said platform may be moved to submerge the spark plug.

2. In a leakage testing machine for testing spark plugs, a mounting having a hollow bore, a tube movable in said bore, a head block having a fluid passage therethrough connected to the upper part of said tube, a valve in said head block for controlling the passage of pressure fluid therethrough, a main operating lever pivoted at one end to said mounting, a connection between said lever and said valve for unseating said valve when said lever is moved in one direction, a lever connected at one end to said mounting, means engaging said tube intermediate the ends for reciprocation thereof, a connection between said lever and said main operating lever, and means carried by said mounting for clamping a spark plug.

3. In a leakage testing machine for testing spark plugs, a mounting having a hollow bore, a tube movable in said mounting, means for controlling the admission of compressed air to said tube, lever means connected to said mounting, means on said lever means engaging said tube for reciprocation thereof, a main operating lever pivoted at one end to said mounting, an operative connection between said operating lever and said tube, relatively movable clamping members carried by said mounting, and an operative connection between one of said members and said main operating lever whereby movement of said main operating lever in one direction actuates one of said clamping members to clamping position.

4. In a leakage testing machine for testing spark plugs, a mounting having a hollow bore, a tube movable in said bore, a bifurcated lever pivoted to said mounting, means on said lever engaging said tube for reciprocation thereof, a main operating lever connected to said mounting, a yielding connection between said main operating lever and said bifurcated lever, clamping members carried by said mounting and relatively movable transverse to the axis of said tube, and an operative connection between one of said members and said main operating lever whereby movement of said main operating lever in one direction actuates one of said members to clamping position.

5. In a leakage testing machine for testing spark plugs, a mounting having a hollow bore, clamping members carried by said mounting, a tube movable in the bore of said mounting, a main operating lever connected to said mounting, an operative connection between said main operating lever and said tube whereby said tube is moved towards said clamping members when said lever is moved in one direction, a transparent container having a liquid therein, supporting means for said container, means for guiding the movement of said supporting means, and means connecting said supporting means and said main operating lever for moving said container to the region of said clamping means when said main operating lever is moved in one direction.

6. In a leakage testing machine for testing spark plugs, a mounting having a bore, a tube movable in said bore, clamping members carried by said mounting, said members being positioned adjacent one end of said tube and being relatively movable transversely to the axis of said tube, a block carried by the opposite ends of said tube and having a fluid passage therethrough, a valve for controlling said passage, lever means connected to said mounting, means on said lever means engaging said tube for reciprocation thereof, a main operating lever connected to said mounting, connection between said main operating lever and lever means, means connecting said valve and main operating lever, a transparent container; means for supporting said container adjacent said clamping members, means for guiding said supporting means, and means for connecting said supporting means and said main operating lever whereby movement of said main operating lever in one direction moves said container to the region of said clamping members.

In testimony whereof, I have hereunto signed my name to this specification.

GEORGE STAEBLER.